(12) United States Patent
Chen et al.

(10) Patent No.: US 6,427,539 B1
(45) Date of Patent: Aug. 6, 2002

(54) STRAIN GAUGE

(75) Inventors: Shiuh-Hui Steven Chen, Lake Zurich; Yanling Kang, Northbrook; Sut-Mui Tang, Buffalo Grove; Joe P. Wang, Long Grove, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/629,270

(22) Filed: Jul. 31, 2000

(51) Int. Cl.[7] .................................................. G01L 9/04
(52) U.S. Cl. ........................................................ 73/726
(58) Field of Search .......................... 73/726, 720, 721, 73/727, 719, 725, 756

(56) References Cited

U.S. PATENT DOCUMENTS

| | | |
|---|---|---|
| 3,761,784 A | 9/1973 | Jund |
| 4,191,057 A | 3/1980 | Busta |
| 4,275,406 A | 6/1981 | Müller et al. |
| 4,317,126 A | 2/1982 | Gragg, Jr. |
| 4,444,054 A | 4/1984 | Schaff, Jr. |
| 4,683,755 A | 8/1987 | Samek |
| 4,986,861 A | 1/1991 | Nishida et al. |
| 4,996,627 A | 2/1991 | Zias et al. |
| 5,356,176 A | * 10/1994 | Wells .......................... 280/737 |
| 5,629,486 A | * 5/1997 | Viduya et al. ................. 73/727 |
| 5,644,102 A | 7/1997 | Rostoker |
| 5,917,264 A | 6/1999 | Maruno et al. |

OTHER PUBLICATIONS

A.D. Khazan "Transducers and Their Elements: Design and Application", Chapter 9, "Micromechanical Sensing and Actuating Structures", Section "Semiconductor Strain Gages", pp. 393–395, Prentice–Hall, Inc., 1994, ISBN 0–13–929480–5.

Karmjit S. Sidhu "Packaging Very High Pressure Transducers For Common Rail Diesel Injection Systems" Measurement Specialties, Inc., Oct. 1987.

* cited by examiner

Primary Examiner—William Oen
(74) Attorney, Agent, or Firm—Gary J. Cunningham; Steven A. May

(57) ABSTRACT

A reliable sensor provides a user-friendly semiconductor sensing device and transducer which accurately detects the characteristics of a fluid, such as pressure and strain, at high temperature operating conditions. The high performance sensor is particularly useful for use with diesel engines and internal combustion engines in vehicles. The sensor can comprise a single die with a transverse strain gauge or a group of strain gauges which are located at a position on the die to help minimize electric effects of thermal stress on the gauges during pressure detection and operation of the vehicle. The die can be glass fused, such as by glass frit, to a diaphragm, such as a stainless steel diaphragm, so as not to readily corrode in the fluid.

20 Claims, 1 Drawing Sheet

STRAIN GAUGE

BACKGROUND OF THE INVENTION

This invention relates to pressure gauges and, more particularly, to semiconductor strain gauges, such as for use in vehicles.

Operating conditions are determined in vehicles with the assistance of sensors. Pressure sensors can be useful to measure the pressure of fluids in vehicles. The sensed pressure can then be transmitted to an electronic display for the driver so that the driver will be alerted when the oil pressure is low and/or in need of further oil, such as motor oil, transmission fluid, etc. or when the carburetor needs more water or antifreeze, e.g. ethylene glycol. In more sophisticated vehicles, the sensed fluid pressure is transmitted to an onboard computer, computer chip, integrated circuit, or engine control unit which can adjust spark plug, timing, ignition (combustion), fuel injection rates, and other operating parameters to help optimize performance and efficiency of the engine and vehicle.

Diesel engines are very often used in trucks, locomotives and other vehicles. Original equipment manufacturers, distributors, and customers of diesel engines, as well as internal combustion engines, desire more efficient fuel delivery systems which minimize pollution in compliance with environmental regulations. Various high pressure direct diesel injection systems have been designed to atomize the fuel so that the fuel burns efficiently with less pollution. The use of pressure transducers in a closed control loop in association with an onboard computer, computer chip, integrated circuit, or engine control unit, can be helpful to improve vehicle performance and minimize harmful emission of pollutants.

Transducers are devices which function generally to convert an input of one form into an output of another form or magnitude. Pressure transducers convert pressure to voltage and are typically piezo-resistive. Pressure transducers are typically strain sensitive rather than displacement sensitive. Pressure transducers comprising semiconductor strain sensing devices are useful in pressure sensing applications, but have generally been previously limited to relatively low temperature applications. Semiconductor strain sensing devices exhibit non-linear impedance variation at elevated temperatures, such as at engine operating conditions. Conventional strain gauge resistors and their sensitivity to strain, usually change in such a manner as to preclude effective temperature compensation. As a result, many, if not most, semiconductor strain sensing devices have not been usable and effective at vehicle operating conditions.

There have been various attempts to provide temperature compensation for semiconductors strain sensors. A temperature compensation circuit has been suggested which comprises series connected PN junction diodes formed in an N epitaxial layer of silicon chips. Another suggestion has been to use a series of resistant strips connected to contact pads which terminate in other contact pairs that are orientated in a specific crystallographic direction. Strain gauges have been connected to a diaphragm to measure strain due to pressure. A further suggestion has been to use a monocrystalline silicon chip with a matrix silicon base material, a silicon diaphragm portion, and integral semiconductor strain sensing elements. It has been suggested to arrange the semiconductor strain sensing elements in a Wheatstone bridge circuit to sense the strain in a silicon diaphragm caused by fluid pressure. Remote terminals have also been suggested for interconnection between integral semiconductor strain sensing elements and circuitry external to the chip and in direct electrical connection to the matrix silicon base material to attempt to control the characteristics of the semiconductor strain sensing device in order to minimize degradation of the semiconductor material at high temperatures. Another suggestion has been to use silicon strain gauges bonded to a stainless steel diaphragm using high temperature glass fusion instead of epoxy bonding. These suggestions and prior semiconductor stains sensing devices have met with varying degrees of success.

High temperatures at which vehicle engines typically operate create high thermal expansion and high thermal stresses which often cause inaccurate pressure readings and measurements. As a result, the information electronically displayed to the driver is often inaccurate and misleading, and the pressure signal transmitted to the onboard vehicle computer, computer chip, integrated circuit, or engine control unit is often incorrect which can result in substandard and inefficient performance of the vehicle. With high engine operating temperatures, thermal stresses can also create electrical noise which can be much larger than the pressure signal. As a result, in some circumstances, the pressure signal may not even be displayed to the driver and transmitted to the onboard computer, computer chip, circuit board, or engine control unit. This situation becomes even more aggravated when different materials are interconnected, such as when a stainless steel diaphragm is bonded to silicon strain gauges by glass fusion. Furthermore, high temperatures can cause cracking, internal rearrangement, instability and even failure in a semiconductor strain sensing devices.

It is, therefore, desirable to provide an improved sensor which overcomes most, if not all, of the preceding problems.

SUMMARY OF THE INVENTION

An improved sensor is provided which can operate at high temperatures, such as the operating temperatures of diesel engines and internal combustion engines. Advantageously, the improved sensor is reliable, accurate, efficient, and effective at the operating temperature ranges of vehicles. Desirably, the user-friendly sensor is economical, convenient, simple to use, and safe.

The specially arranged sensor has at least one semiconductor and a detector for contacting a fluid. Desirably, the detector comprises a fluid responsive detector comprising a material which resists corrosion from the fluid. In the preferred form, the detector comprises a stainless steel diaphragm.

The specially arranged sensor also includes at least one gauge (gage) for measuring at least one characteristic of a fluid. The fluid can comprise a gas or a liquid, such as motor oil, diesel oil, transmission oil, brake fluid, gasoline, a petrochemical composition, such as antifreeze (ethylene glycol) etc., or water. Preferably, the gauge is operatively connected to the semiconductor and is advantageously positioned at a location to help minimize electrical effects of thermal stress during measuring. In the preferred form, the gauge comprises a vehicle gauge to measure at least one characteristic of a fluid in a vehicle, such as an automobile, sport utility vehicle (SUV), van, station wagon, truck, motorcycle, railway car (locomotive), airplane, ship, boat, barge, tractor, lift truck, backhoe, bulldozer, crane, and various road grading equipment. The gauge can be a stress gauge, pressure gauge, force gauge, or preferably a strain gauge. Desirably, the gauge is positioned at a location to help minimize the electrical effects of thermal stress and strain during operation of the vehicle and engine.

A support can be provided to hold and support the gauge. The support can comprise a die, a glass substrate, or a metal substrate formed of a metal such as aluminum, niobium, titanium, chromium, iron, bismuth, antimony, or steel. Preferably, a coupling is provided to secure the support to the diaphragm or other detector. In the preferred form, the support comprises a silicon-containing die and the coupling comprises glass frit providing fused glass.

The sensor can comprise a transducer with at least one semiconductor comprising one or more interconnects. The interconnects can comprise a silicon-containing semiconductor, such as an amorphous, microcrystalline, or polycrystalline silicon semiconductor, silicon carbon semiconductor, or silicon germanium semiconductor, or a copper indium diselinide (CIS) semiconductor, a copper indium gallium selenide (CIGS) semiconductor, or a gallium arsenide semiconductor.

In one form, the sensor includes an array of gauges comprising a group of interconnected resistors positioned in a special Wheatstone bridge arrangement on a single silicon-containing die to help minimize electric effects of thermal stress on the gauges during measuring and operation of the vehicle.

In another form, the sensor comprises a single transverse gauge which is specially arranged and positioned on a single silicon-containing die to help minimize electric effects of thermal stress on the transverse gauge during measuring and operation of the vehicle.

A more detailed explanation of the invention is provided in the following description and appended claims taken in conjunction with the accompanying drawings.

DETAILED DESCRIPTION OF THE PREFERRED EMBODIMENTS

Figure 1:
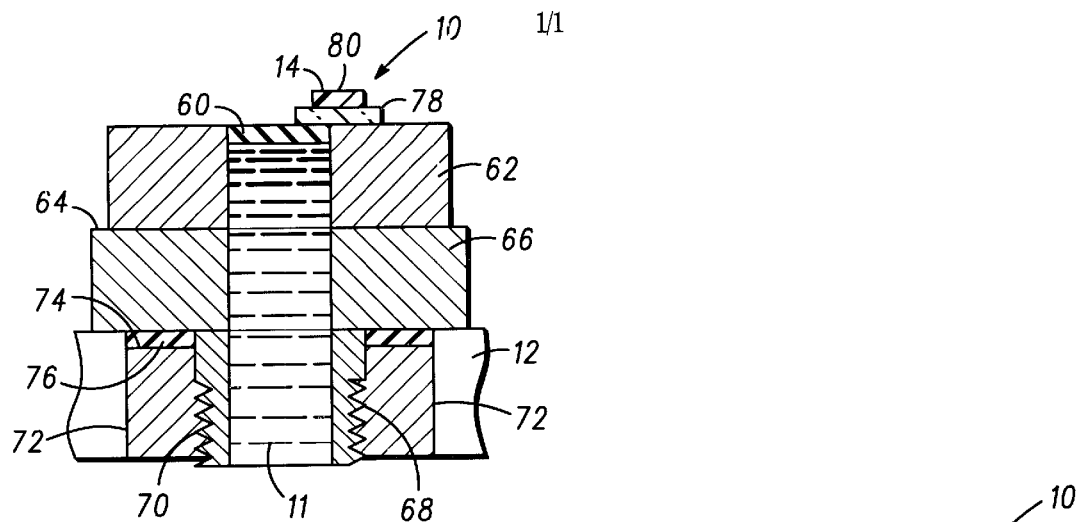
FIG. 1 is a cross-sectional view of a sensor in accordance with principals of the present invention.

A sensor 10 (FIG. 1) provide a semiconductor strain sensing device, pressure transducer, and sensor assembly for detecting and sensing pressure and strain from a fluid 11 in a vehicle 12. The sensed vehicle fluid can comprise diesel oil, motor oil, transmission oil, brake fluid, gasoline, etc. In the illustrative embodiment, the sensor comprises a gasoline direct injection (GDI) pressure sensor.

The pressure sensor has a single geometrically symmetrical thin silicon sensing die 14 (FIGS. 1 and 2), which also referred to as silicon-containing die. The die can have a thickness, such as ranging from 5 to 50 micrometers (μm). The die can also have a unique die number 16 (FIG. 2) and an orientation fiducial 18. The die has sufficient structural strength and integrity to support one or more strain gauges (gages) 21–24. Preferably, the die is imperforate, fluid impervious (impermeable), and generally rigid. The die has a geometric center 26, a square periphery 28, and square metal bond pads 31–34 which are positioned in proximity and adjacent to the corners 36 of the die. A set, series, or array of square silicon oxide openings providing electrical contacts 37–40 are disposed and securely positioned underneath the pads. The electrical contacts are fabricated of metal, such as aluminum, and include at least one input contact and at least one output contact. In the illustrative embodiment there are two input contacts 38 and 40, with one of the input contacts 40 defining a reference or ground, and there are two output contacts 37 and 39. The periphery of the die can comprise a square perimeter with an silicon nitride coating which has windows 41–44 to permit access to the metal pads. The pressure sensor has semiconductors 46–49 which provide interconnects with partially square distal end portions 51–54 that connect the strain gauges to the metal contacts. In the illustrative embodiment, the interconnects comprise P+ doped silicon-containing interconnects. Wires are secured to the metal pads for receiving and transmitting voltages and currents responsive to the pressure and strain of the fluid being sensed in the vehicle.

While a square die is illustrated, in some circumstances it may be desirable to use other symmetrical geometrical shapes for the die. Furthermore, while square pads and square metal contacts are illustrated, in some circumstances it may be desirable to use pads and metal contacts of other shapes.

Figure 2:
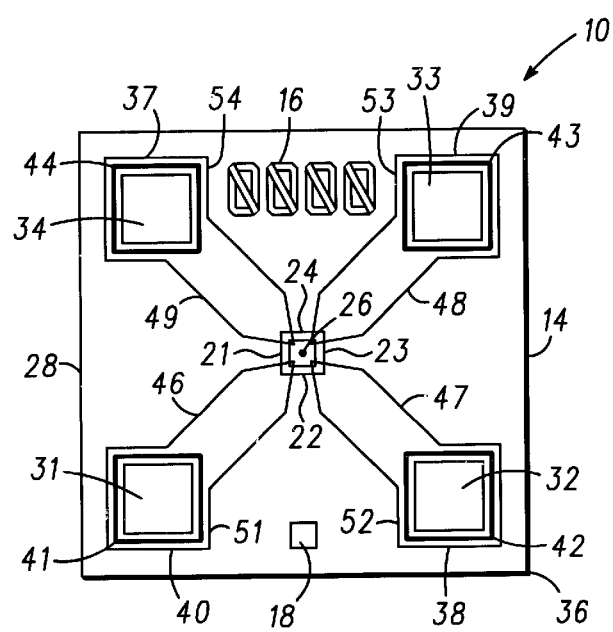
FIG. 2 is an enlarged view of a single silicon-containing die with an array of strain gauges positioned in a Wheatstone bridge arrangement in accordance with principals of the present invention.

The pressure sensor of FIG. 2 has an array, set, series or group of strain gauges comprising a group, set, array or series of strain gauges comprising interconnected resistors positioned in a Wheatstone bridge arrangement on the single silicon-containing die. The gauges measure strain in response to and induced by pressure of a fluid, such as fluid in a vehicle. In the illustrative embodiment of FIG. 2, there are four strain gauges. In some circumstances, it may be desirable that the array of gauges comprise two, three or more than four strain gauges. The array of strain gauges define a center line which provides a strain gauge-geometric center 26. The strain gauge-geometric center of the array of strain gauges is preferably positioned and registered in alignment in proximity to and most preferably concentric with the geometric die-center of the silicon-containing die in order to help minimize electric effects of thermal stress on the gauges during measuring and operation of the vehicle. Advantageously, the array of strain gauges are thermally and geometrically symmetrical with each other. The strain gauges are located on the silicon-containing die in a position at the thermal center of the thermally induced stress/strain so that the thermal induced longitudinal stresses on the gauges are about equal to and cancel the electrical effect of thermally induced stresses on the gauges during operation of the vehicle. Desirably, the gauges are arranged in a symmetrical array and group.

A fluid responsive diaphragm 60 (FIG. 1) provides a detector which is held by a diaphragm-support 62. The diaphragm-support can be made of metal and is connected to a grippable hexagonal housing 64. The grippable housing can also be made of metal and can have a T-shaped cross-sectional configuration with an enlarged head portion 66 and an externally threaded portion 68. The externally threaded portion of the grippable housing can engage and be connected to an internally threaded portion 70 of a fuel rail 72 comprising a pipe or conduit. One end 74 of the fuel rail is fluidly sealed and connected to the head of the grippable housing by an annular seal 76. The diaphragm can be positioned in and contact the fluid in the vehicle to sense and detect the pressure of the fluid. Preferably, the diaphragm, diaphragm-support, grippable housing, and fuel rail are fabricated of a corrosion-resistant material that will not readily corrode in the fluid being detected and sensed. In the preferred embodiment, the diaphragm comprises a metal diaphragm, and most preferably a stainless steel diaphragm.

A symmetrical pressure-conductive coupling 78 (FIG. 1) can be provided to connect the silicon die to the diaphragm. The symmetrical coupling comprises a corrosive-resistant pressure-conductive electrically insulating material to conduct and transmit the sensed pressure (pressure signal) from the diaphragm to the die. In the preferred form, the coupling comprises glass frit (fused glass). Glass frit is useful because it electrically isolates and prevent shorts from the metal diaphragm. The symmetrical coupling can be square and have the same shape and surface area as the die. In some circumstances, it may be desirable that the glass frit coupling be of a different symmetrical shape, such as a four leaf clover shape, a square with rounded corners, a circle, hexagon, etc. The symmetrical coupling can define a geometric coupling-center 80 (FIG. 1). The geometric coupling-center can be registered and positioned in alignment in proximity to and is preferably concentric with the center (strain gauge-center) of the array of strain gauges and the geometric die-center of the silicon-containing die to further help minimize electrical effects of thermal stress on the gauges during measurement and operation of the vehicle. The diaphragm provides a force-gathering element which converts pressure into a measurable strain. The strain gauges comprise resistors which provide strain gauge elements that transform the strain into a proportional electric signal. The die provides a support surface and housing for the strain gauges, interconnects and metal contacts. The die provides protection against environmental conditions. The die also incorporates signaling conditioning and a mechanical and electrical interface. The gauges can comprise homogeneously doped single-crystal silicon and can be formed within the silicon die. The frit glass provides electrical isolation to minimize short circuiting of the metal diaphragm. The symmetrical fritted glass coupling can be screen-printed and can be formed by fusing glass. The metal contacts can comprise aluminum or other electrically conductive metals. Both P– and P+ can be formed on an N epilayer.

The symmetrical array of strain gauges positioned in a Wheatstone bridge arrangement provide minimal responsive to temperature changes as a result of cancellation of electrical signals due to thermal stresses. Accordingly, parameters such as input resistance, offset voltage, etc. are minimal facilitating temperature compensation of the sensor.

As discussed above, in some circumstances it may be desirable to use other symmetrical shapes for the die and the coupling, such as a square width rounded corners, a circle, a cross, a four leaf clover, etc.

Figure 3:
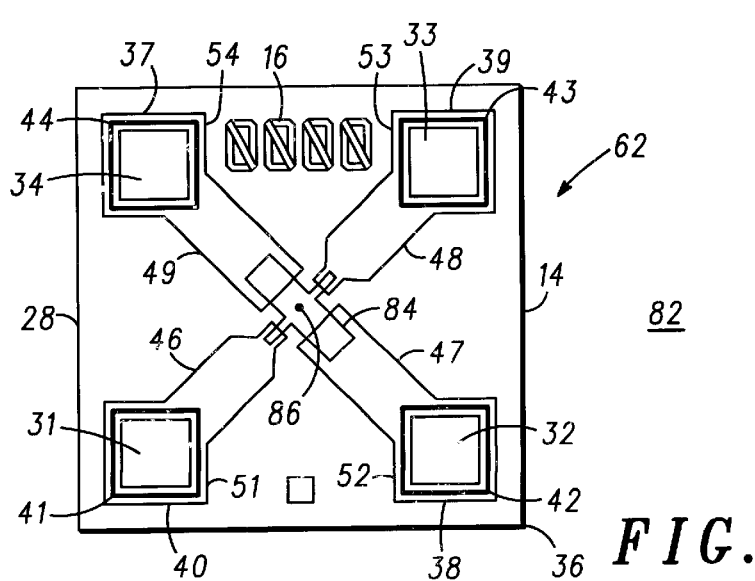
FIG. 3 is an enlarged view of a single silicon-containing die with a single transverse strain gauge in accordance with principals of the present invention.

The sensor 82 of FIG. 3 is structurally and functionally similar to the sensor of FIG. 1, except that a single transverse strain gauge 84 (FIG. 3) is positioned on the silicon-containing die to measure strain in response to pressure of a fluid in a vehicle, instead of an array of strain gauge positioned in a Wheatstone bridge arrangement and pattern. The transverse strain gauge defines a transverse center 86 (FIG. 3). The transverse center is at the thermal and geometrical center of the die. Advantageously, the transverse center of the transverse strain gauge is registered and positioned in alignment in proximity to and preferably concentric with the geometric center of the symmetrical die to help minimize electrical effects of thermal stress on the transverse strain gauge during measuring and operation of the vehicle. Desirably, the transverse strain gauge is located on the symmetrical die in a position so that thermally induced shear stress is minimal during operation of the vehicle. In the illustrative embodiment of FIG. 3, the transverse strain gauge comprises a single resistor.

The geometric coupling center of the symmetrical glass frit coupling is preferably positioned and registered in alignment in proximity to and preferably concentric with the transverse center of the transverse strain gauge and the geometric center of the symmetrical die to further help minimize electrical effects of thermal stress on the transverse strain gauge during measurement and operation of the vehicle.

The transverse strain gauge can comprise a single four contact resistor element orientated to maximize response to pressure induced stresses through shear stress effects. The resistor can be formed in a silicon membrane or die having a surface orientation, such that the edges of the membrane are orientated along the crystalline directions. The transverse strain gauge comprising the single resistor can be provided with current contacts which allow forcing of a current along a current axis, such as at 45 degrees with respect to the edge of the membrane or die. The transverse voltage can be generated in response to pressure induced stresses which can be detected at voltage contacts located at the edges of the transverse stress gauge. The voltage can be generated along a line perpendicular to the current axis.

The transverse strain gauge can comprise a pressure transducer with a transducer element formed in a membrane or die by diffusion, ion implementation, etc. The transducer element can comprise an elongated resistor portion which is orientated along a current axis. The current axis can be orientated along a crystalline direction and can form a 45 degree angle with an edge of the membrane or die as discussed previously. Current contacts can make electrical contact to the ends of the resistor. The current contacts can be formed from a heavily doped diffusion which provides a low impedance path from the ends of the resistor to a location outside the diaphragm or die.

The transverse strain gauge can have voltage taps which are positioned on two sides of the resistor, such as approximately midway along the length of the resistor. Voltage taps allow the detection and measurements of a transverse voltage generated in response to flexing of a diaphragm or die when the current flows along the current axis. Ohm contact to voltage taps can be made by voltage contacts. The voltage contacts can be heavily doped, high conductivity regions which extend from the voltage taps to a position outside the diaphragm or die.

The transverse strain gauge can have a transducer element positioned adjacent or close to the edge of diaphragm at a location midway along the diaphragm edge. This position and location in combination with orientation of the current axis along the direction indicated above, maximizes shear stress in the resistor while minimizing longitudinal and transverse stresses along the current axis.

In the transverse strain gauge, a pressure differential across the diaphragm can produce a voltage which is detectable at the voltage taps. Such voltage can be proportional to the magnitude of the pressure differential. This can be characterized as a physical analog to a Hall device.

Because of symmetries in the silicon crystal of the transverse stress gauge, the transducer element can be placed at other locations on the die which are crystallographically equivalent to a square die. The strain gauge is preferably positioned at the geometrical center of the die to maximize the shear stress effect without encountering undesirable edge or boundary effects, as well as to minimize electrical effects of thermal stress on the transverse strain gauge during fluid detection, measurement and operation of the vehicle.

In the sensor or pressure transducer, the transverse strain gauge can comprise a P-type resistor. The resistor can be diffused to a depth such as about 4 micrometers ($\mu$m) and can have a resistance of about 500 ohms. The transverse strain gauge, the current contact and contact to voltage taps, can be high concentration P-type diffusions having a resistance of about 10–20 ohms. The contact diffusion can be of a sufficiently high conductivity so as not to appreciably interfere with the operation of the transducer element. Contact to the voltage taps and the current contacts can also be made by metallically contacting the transducer element to the semiconductor interconnects.

The symmetrical die and semiconductors (interconnects) can be fabricated of a silicon-containing material, such as hydrogenated silicon, hydrogenated silicon carbon, or hydrogenated silicon germanium. The silicon-containing material can be amorphous, polycrystalline, or microcrystalline. The silicon-containing material can be fabricated and deposited by enhance plasma chemical vapor deposition (EP CVD), also referred to as plasma enhanced chemical vapor deposition (PE CVD). The P+ doped connectors (interconnects) can be positively doped with diborane ($B_2H_6$), BF, or other boron-containing compounds. If negatively doped interconnects or negatively doped other areas of the die are desired, the silicon can be negatively doped with phosphine ($PH_3$) or some other phosphorous containing compound.

Among the many advantages of the inventive sensor and gauges are:
1. Outstanding performance throughout the entire operating range of vehicle.
2. Minimal adverse effect from thermally induced stresses.
3. Minimal measurement deviation at engine operating temperatures.
4. Superb pressure detection.
5. Excellent measurements of fluids in vehicles.
6. Easy to operate.
7. Simple to use.
8. User-friendly.
9. Dependable.
10. Accurate.
11. Economical.
12. Safe.
13. Efficient.
14. Effective.
15. Longer life.
16. Enhanced wear.

Although embodiments of the invention have been shown and described, it is to be understood that various modifications, substitutions and rearrangements of parts, components and process steps, can be made by those skilled in the art without departing from the novel spirit and scope of this invention.

What is claimed is:

1. A sensor, comprising;

at least one semiconductor;

a detector for contacting a fluid: and a plurality of gauges for measuring at least one characteristic of said fluid, each gauge of said plurality of gauges being operatively connected to said semiconductor and to said detector and being positioned at a location for helping minimize any differential in thermally induced strain between said gauge and each of said other gauges of said plurality of gauges during said measuring.

2. A sensor in accordance with claim 1 wherein said sensor comprises a transducer.

3. A sensor in accordance with claim 1 wherein:

said gauge comprises a vehicle gauge for measuring at least one characteristic of a fluid in a vehicle;

said vehicle being selected from the group consisting of an automobile, sports utility vehicle, van, station wagon, truck, motorcycle, railway car, airplane, ship, boat, barge, tractor, lift truck, backhoe, bulldozer, crane, and road grading equipment; and said gauge being positioned at a location for helping minimize electrical effects of thermal stress from operation of said vehicle.

4. A sensor in accordance with claim 1 wherein:

said gauge is selected from the group consisting of a strain gauge, a stress gauge, a pressure gauge, and a force gauge;

said fluid comprises a liquid or a gas; and said liquid is selected from the group consisting of motor oil, diesel oil, transmission oil, brake fluid, gasoline, a petrochemical, and water.

5. A sensor in accordance with claim 1 wherein said semiconductor comprises at least one interconnect of the group consisting of a silicon-containing semiconductor, an amorphous silicon semiconductor, an amorphous silicon carbon semiconductor, an amorphous silicon germanium semiconductor, a microcrystalline silicon semiconductor, a microcrystalline silicon carbon semiconductor, a microcrystalline silicon germanium semiconductor, a polycrystalline silicon semiconductor, a polycrystalline silicon carbon semiconductor, a polycrystalline silicon germanium semiconductor, a copper indium diselinide (CIS) semiconductor, a copper indium gallium selenide (CIGS) semiconductor, and a gallium arsenide semiconductor.

6. A sensor in accordance with claim 1 wherein said detector comprises a fluid responsive detector comprising a material for resisting corrosion from the fluid.

7. A sensor in accordance with claim 6 wherein said detector comprises a stainless steel diaphragm.

8. A sensor in accordance with claim 1 including a support for supporting said gauge, said support being selected from the group consisting of a die, a glass substrate, and a metal substrate; and said method substrate comprises a metal selected from the group consisting of aluminum, niobium, titanium, chromium, iron, bismuth, antimony, and steel.

9. A sensor in accordance with claim 8 including a coupling for securing said support to said detector.

10. A sensor in accordance with claim 9 wherein:

said support comprises a silicon-containing die; and said coupling comprises glass frit.

11. A sensor, comprising:

a single silicon-containing die having a geometric center, a periphery, and pads positioned in proximity to said periphery;

a set of metal electrical contacts disposed on said pads, said metal electrical contacts including at least one input contact and at least one output contact;

an array of strain gauges comprising a group of interconnected resistors positioned in a Wheatstone bridge arrangement on said single silicon-containing die for measuring strain in response to pressure of a fluid in a vehicle, wherein said array of strain gauges is symmetrically distributed around a strain gauge-center and wherein said strain gauge-center is registered in alignment in proximity to said geometric center of said silicon-containing die for helping minimize any differential in thermally induced strain between said gauge and each of said other gauges of said array of strain gauges during said measuring and operation of the vehicle;

semiconductors comprising interconnects connecting said strain gauges to said metal contacts;

a corrosion-resistant diaphragm for contacting and sensing pressure of the fluid in the vehicle, and a pressure-conductive corrosion-resistant coupling for connecting said silicon-containing die to said diaphragm, said coupling comprising a pressure-conductive. electrically insulating material for conducting the sensed pressure from said diaphragm to said die.

12. A sensor in accordance with claim 11 wherein:

said array of strain gauges are located on said silicon-containing die in a position so that thermally induced longitudinal stress on said gauges is about equal to and cancels electrical signal due to thermally induced stress on said gauges during operation of the vehicle; and said gauges are arranged in a symmetrical array.

13. A sensor in accordance with claim 11 wherein:

said coupling defines a geometric coupling-center; and said geometric coupling-center is registered in alignment in proximity to the strain gauge-center of said array of strain gauges and said geometric center of said silicon-containing die for helping minimize electrical effects of thermal stress on said gauges during operation of the vehicle.

14. A sensor in accordance with claim 13 wherein:

said material of said coupling comprises glass frit;

said diaphragm comprises a stainless steel diaphragm; and said semiconductors comprise P+ doped silicon-containing interconnects.

15. A sensor, comprising:

a single silicon-containing die having a geometric center, a periphery, and pads positioned in proximity To said periphery;

a set of metal electrical contacts disposed on said pads, said metal electrical contacts including at least one input contact and at least one output contact;

a single transverse strain gauge positioned on said silicon-containing die for measuring strain in response to pressure of a fluid in a vehicle, said transverse strain gauge defining a transverse center that is registered in alignment in proximity to the geometric center of said silicon-containing die, and wherein said transverse strain gauge is positioned on said silicon-containing die so that thermally induced normal stress on said transverse stress gauge in a longitudinal direction is about equal to and cancels normal thermally induced stress on said transverse stress gauge in a lateral direction during operation of said vehicle;

interconnects connecting said transverse strain gauge to said metal contacts;

a corrosion-resistant diaphragm for contacting and sensing pressure of the fluid in the vehicle; and a pressure-conductive corrosion-resistant coupling for connecting said silicon-containing die to said diaphragm, said coupling comprising a pressure-conductive electrically insulating material for conducting the sensed pressure from said diaphragm to said die.

16. A sensor in accordance with claim 15 wherein said transverse strain gauge comprises a single resistor.

17. A sensor in accordance with claim 15 wherein:

said coupling defines a geometric coupling center; and said geometric coupling-center is registered in alignment in proximity to the transverse center of transverse strain gauge and said geometric center of said silicon-containing die for helping minimize electrical effects of thermal stress on said transverse strain gauge during operation of the vehicle.

18. A sensor in accordance with claim 17 wherein:

said material of said coupling comprises glass frit;

said diaphragm comprises a stainless steel diaphragm; and said semiconductor comprises P+ doped silicon-containing interconnects.

19. A sensor in accordance with claim 1 wherein each of said semiconductor and said gauge are single-crystalline and wherein said semiconductor and said gauge are similarly oriented in terms of crystallographic orientation.

20. A sensor in accordance with claim 1 wherein said sensor defines a geometric center and wherein a location of said gauge and a shape of said semiconductor are such that their appearance remains unchanged after one or more 90° rotations of said sensor around said geometric center.

* * * * *